Nov. 29, 1938.  J. M. TRINER  2,138,261

SCALE

Filed March 27, 1936  4 Sheets-Sheet 1

Inventor:
James M. Triner
By Walter M. Fuller
Atty.

Nov. 29, 1938.                J. M. TRINER                    2,138,261
                                 SCALE
                    Filed March 27, 1936        4 Sheets-Sheet 2
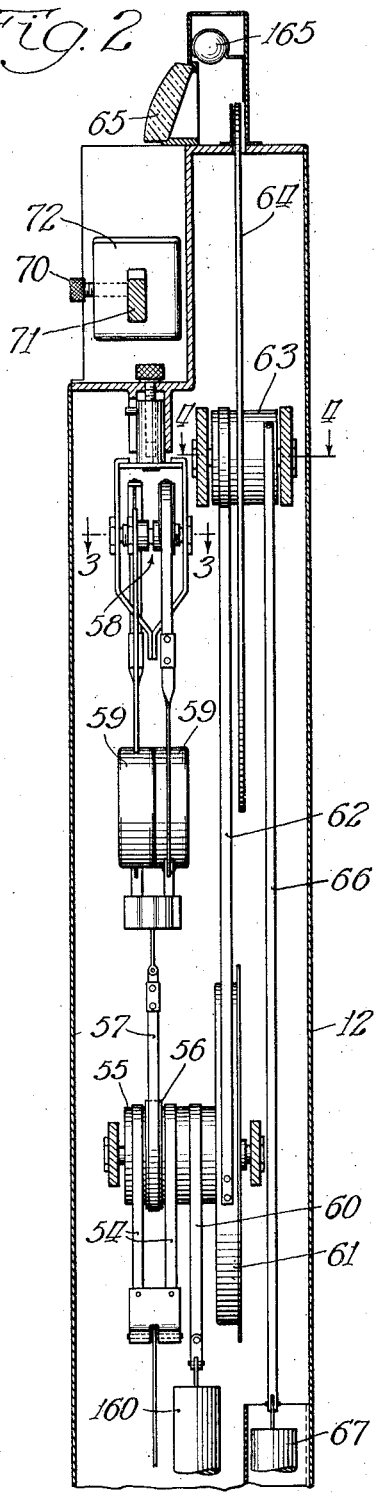
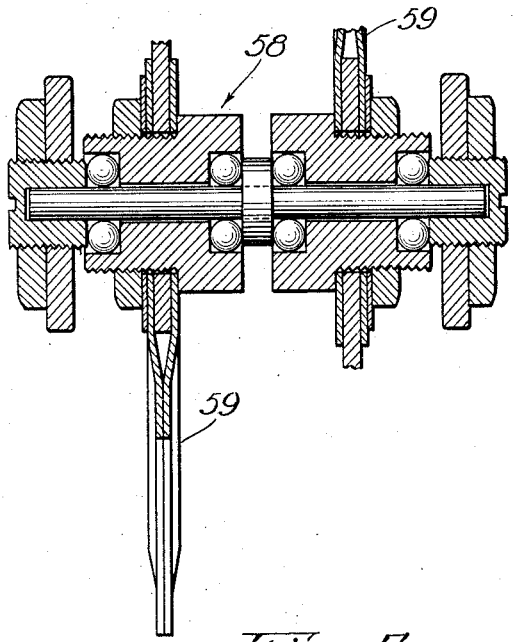
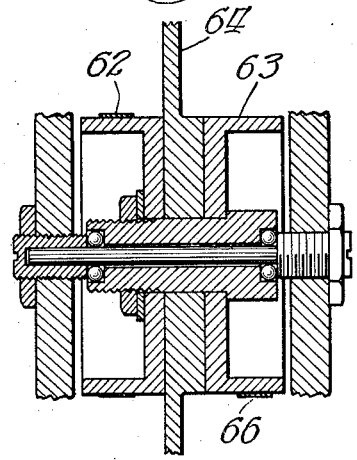
Inventor:
James M. Triner
By Walter M. Fuller
                Atty.

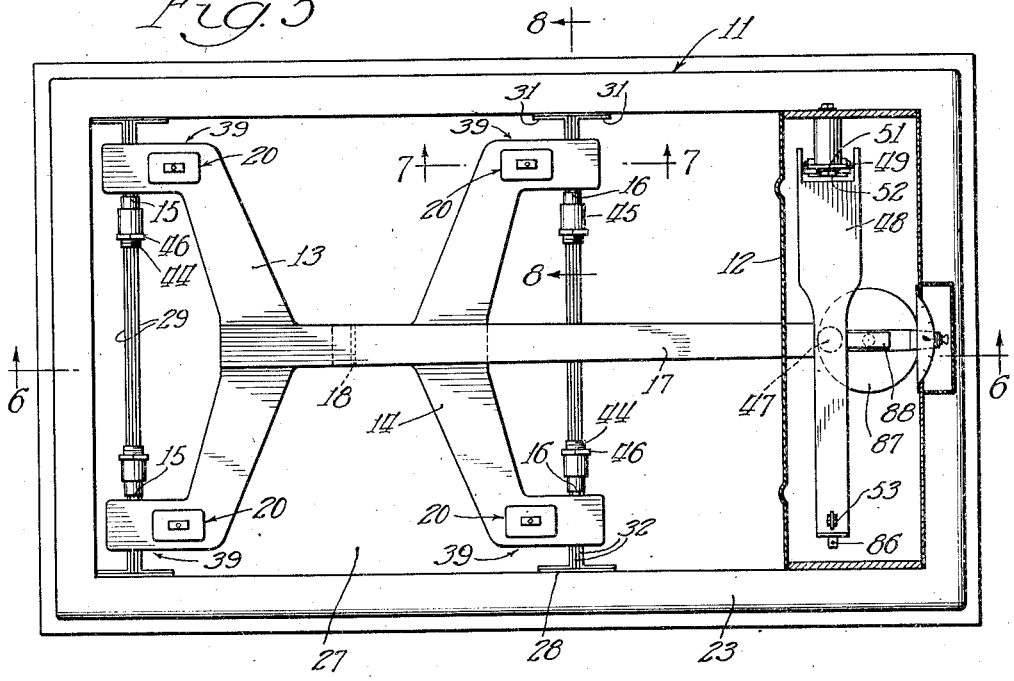
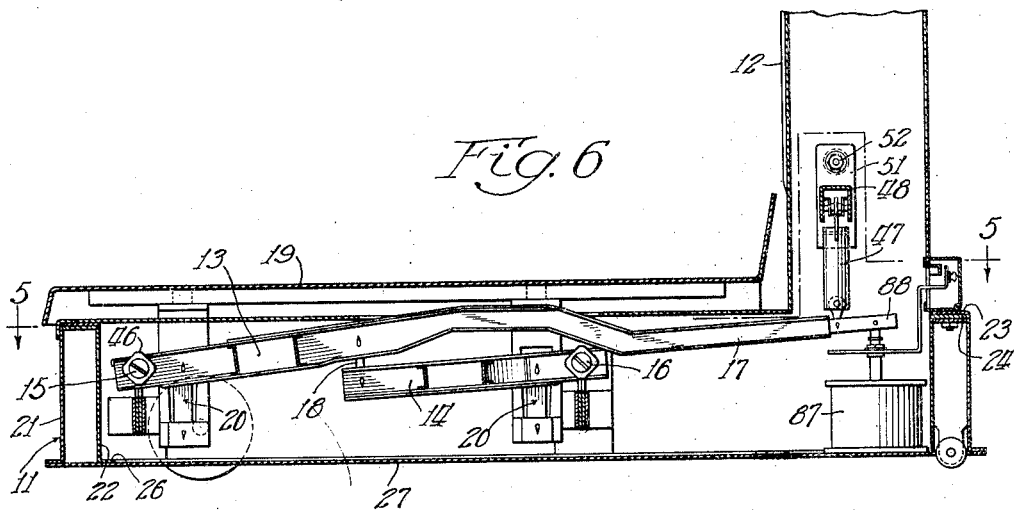

Nov. 29, 1938.  J. M. TRINER  2,138,261
SCALE
Filed March 27, 1936   4 Sheets-Sheet 4
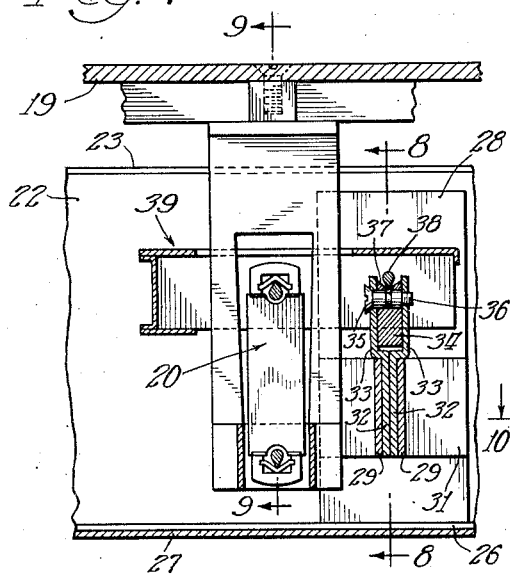
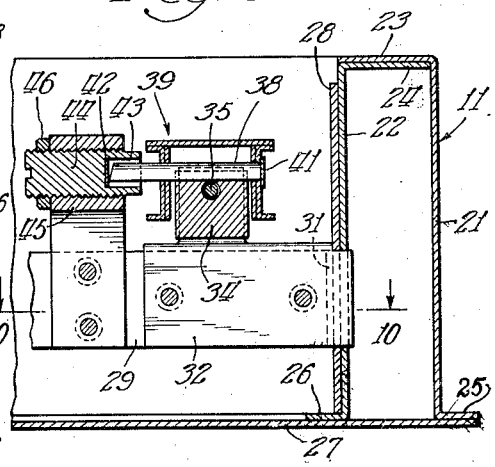
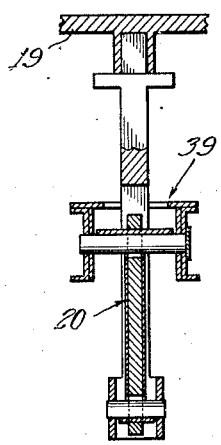
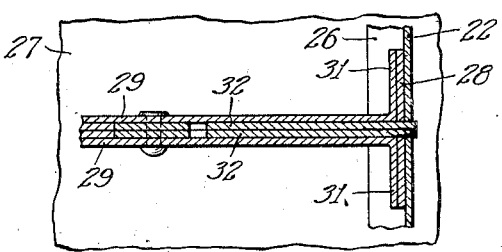
Inventor:
James M. Triner
By: Walter M. Fuller Atty.

Patented Nov. 29, 1938

2,138,261

UNITED STATES PATENT OFFICE 2,138,261

SCALE

James M. Triner, Chicago, Ill., assignor to Triner Scale & Manufacturing Company, Chicago, Ill., a corporation of Illinois Application March 27, 1936, Serial No. 71,153

10 Claims. (Cl. 265—71)

The present invention relates to weighing scales and pertains more particularly to appliances of that character equipped with tare-beams and their associated counter-poises.

Some of the leading objects and purposes of the novel invention may be stated as the provision of a scale or weighing apparatus of the type specified which is relatively simple in structure, which can be manufactured at comparatively low cost, which is unlikely to become damaged in ordinary service, which is accurate, which is subject to a minimum of wear in use, which maintains its precision of weighing qualities over a long period of service, which may be used with ease and facility, etc.

To the accomplishment of these and other desirable aims a present preferred embodiment of the invention has been developed and illustrated in the accompanying drawings forming a part of this specification and to which reference should be had in connection with the following detailed description, like reference numerals, for the sake of simiplicity, being employed to designate the same parts throughout the several views.

In these drawings:—

Figure 2 is a fragmentary vertical section on a larger scale through the same portion of the apparatus on approximately line 2—2 of Figure 1, the parts being viewed in the direction indicated by the arrows;

Figure 3 is an enlarged horizontal section on line 3—3 of Figure 2 showing the mounting for the weight-absorbing pendulums;

Figure 4 is a similar horizontal section on line 4—4 of Figure 2 illustrating the mounting for the graduated wheel or disc;

Figure 5 is a horizontal section through the base portion of the apparatus on the broken line 5—5 of Figure 6;

Figure 6 is a fragmentary vertical section through the same part of the appliance on line 6—6 of Figure 5;

Figure 7 is a partial vertical section on an enlarged scale on line 7—7 of Figure 5;

Figure 8 is an incomplete vertical cross-section on the same larger scale on line 8—8 of Figure 5 or of Figure 7;

Figure 9 is a fragmentary vertical section on line 9—9 of Figure 7;

Figure 10 is a small horizontal section on line 10—10 of Figure 8 but on a larger scale;

Figure 1:
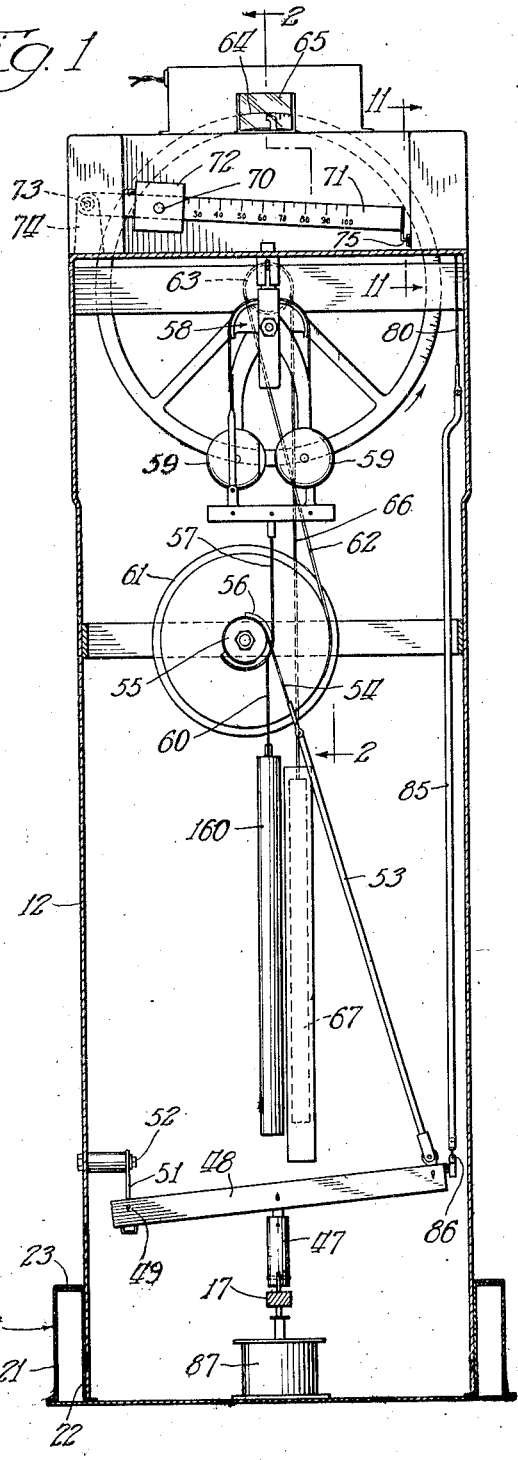
Figure 1 is a vertical section through the upright standard or column of the scale.
Figure 11:
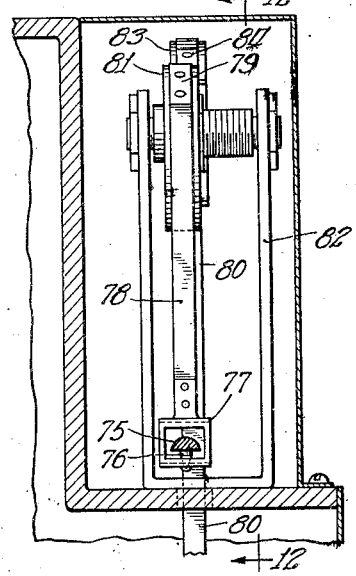
Figure 11 is a vertical, large-scale cross-section through the top portion of the column or standard on line 11—11 of Figure 1.

Referring to these drawings, it will be perceived that the novel and improved scale comprises a base-casing or platform-housing 11 of appropriate construction with an upright standard of column 12 at one end thereof.

Such base accommodates a pair of levers 13 and 14 fulcrumed respectively at 15 and 16, such lever 13 having an extension or nose-iron 17 projecting to a position below the specified standard or hollow post 12, the two levers being linked together at 18 and associated by any suitable means 20, as presented in Figure 9, with the platform 19 on which the article to be weighed may be deposited.

Referring more specifically to the structural details of this portion of the apparatus, it will be noted, as illustrated perhaps more clearly in Figures 8 and 10, that each of the hollow side-walls of the platform-housing is built up of a pair of sheet-metal, Z-shaped, outer and inner members 21 and 22, respectively, the top, inwardly-extended flange 23 of the part 21 overlapping the companion, outwardly-directed flange 24 of the inner element 22 to which it is welded or otherwise secured, the narrower, lower flange 25 of the member 21 projecting outwardly, the corresponding lower flange 26 of the part 22 projecting inwardly, the floor of such hollow base or housing comprising a plate 27 welded or otherwise secured to the flanges 25 and 26.

Such several structural elements, being thus welded together, form a strong and rigid base for the whole scale, all as will be readily understood.

Inasmuch as the fulcrum-mountings of the two levers 13 and 14 are alike, the following description of one of them will suffice for both.

The inner surfaces of the two, opposite side-walls of the base 11 have stiffening, strengthening, and reinforcing plates 28 (Figs. 8 and 10) welded thereto, and the cross-bar construction for supporting the fulcrum-members of the corresponding lever is made up of two horizontal, parallel bars or narrow plates 29, 29 extending from side-wall to side-wall of the base and having at their opposite ends terminal flanges 31, 31 bearing against and welded to the inner surfaces of the reinforcing plates 28.

At each end such cross-bar has two plates 32, 32 riveted between the pair of plates or bars 29, 29 and at that position occupying the whole space between them, and, to strengthen the structure, the plates 32, 32 extend outwardly beyond the flanges 31, 31, their projecting portions snugly fitting in registering apertures provided for that purpose in the parts 22, 28.

Each pair of plates 32, 32 above the top edges of the parts 29, 29 have upwardly-extended, parallel ears 33, 33 (Fig. 7) for a portion of their length bent to provide a suitable space between them to accommodate a bearing-block 34 forming one member of one knife-edge fulcrum for the lever, the ears and intermediate block being apertured in register to receive a pivot-pin 35 which rockingly supports the block and on which the latter may turn to secure automatically the proper alignment of the parts.

As is shown in Figure 7, one end 36 of such pin is screw-threaded and fits in a screw-threaded hole in one of the ears 33, the other end of the screw-pin having a slotted head by means of which it may be screwed into place.

The top edge of block 34 has a V-shaped channel or seat 37, and, where the pin 35 intersects such channel, it is peripherally grooved to avoid contact with the knife-edge member 38 bearing on the seat 37 and mounted in apertures in the side-walls of the corresponding arm 39 of the particular lever 13 or 14 under consideration, the part 38 being prevented from shifting longitudinally outwardly in one direction by a clip or guard 41 (Fig. 8), the other end of the member 38, which protrudes beyond its side-wall of the arm 39, being bevelled downwardly to a point at its lower edge, which point bears against a hard, tool-steel disc 42 in a cavity 43 in the end of an adjustable screw 44 in and extended through a threaded passage in a block or support 45 mounted in any approved manner on the bars 29, 29, the screw having a lock-nut 46 to prevent unintentional turning or loosening thereof.

Thus the scale is equipped with four such knife-edge fulcrum means and companion screws 44 and their contained hard-metal discs which permit nice and exact adjustments to be made to prevent the two correlated levers from shifting sidewise yet allowing free and easy rocking movements thereof with a minimum of friction and with but slight wear of the mechanical parts involved.

The lever extension or nose-piece 17 by means of a link 47 is operatively connected to the middle portion of a transmission lever 48 (Figs. 1 and 6), the latter being fulcrumed at 49 on the lower end of a link 51 rockingly mounted and fulcrumed at its upper end at 52 on the casing 12 allowing the link to move laterally of the lever, whereby such end of the lever may likewise shift laterally to effect automatic alignments of the parts of the mechanism.

Near its other end such lever 48, which is in the lower portion of the upright standard 12, is connected by a rod or link 53 and associated steel-tapes 54 (Figs. 1 and 2) to the smaller-diameter section 55 of a suitably-mounted, revoluble, motion-multiplying wheel, a larger section 56 of which through a steel-tape or band 57 is operatively connected to a weight-absorbing mechanism 58 incorporating a pair of pendulums 59, 59, this part of the structure being substantially like that, or the equivalent of that, disclosed in Patent 1,290,415, Triner, Scale, granted January 7, 1919, the ball-bearing mountings which may be of any suitable and appropriate design for such part of the appliance being illustrated in Figure 3.

The hub of this motion-multiplying wheel has a flexible steel-tape 60 fastened thereto at one end, its other end carrying a counter-weight 160 which helps to balance the mechanism and to keep the steel tapes or bands taut.

The largest-diameter part 61 of such motion-multiplying device is fitted with a flexible metal-tape 62 secured thereto at one end, such tape being connected at its upper end to the face of a revolubly-mounted duplex-drum 63 between the two parts of which and secured thereto is a wheel or disc 64 provided on its front face with weight-indicating figures individually visible through a glass-lens 65 as they are brought into register therewith at the top of the machine, an electric-lamp 165 being provided at this portion of the appliance for illuminating the top, exposed, active part of the disc, all as will be readily understood from an inspection of Figures 1 and 2, the drum 63 also having a tape 66 (Fig. 2) attached thereto and carrying an appropriate counter-weight 67 at its lower end to hold the tapes or bands taut.

The specified motion-increasing device assures a greater degree of rotation of the indicating-wheel than has heretofore been available, and it provides means permitting greater separation of the weight-legends on the front of the wheel and type-legends (not shown) on the back of the wheel forming part of a printing mechanism constituting the subject-matter of my copending patent application Serial No. 71,154.

A graduated tare-beam 71 (Figs. 1 and 2) fitted with a slidable weight or poise 72, which may be fixed in adjusted position on the beam by its set-screw 70, is fulcrumed at one end at 73 on a bracket 74, the element 72, as will be readily understood, being movable along the beam 71 and cooperating with its graduations.

Figure 12:
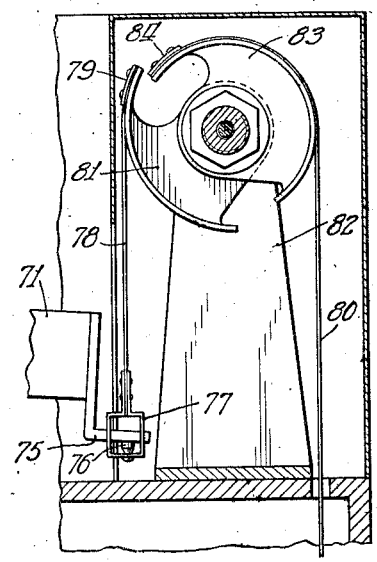
Figure 12 is a vertical section on line 12—12 of Figure 11.

At its other end, an arm 75 (Fig. 12) on the tare-beam 71 has a downwardly-directed, sharp-pointed pin 76 bearing in a socket in the bottom portion of a stirrup 77 attached to the lower end of a flexible, metal band 78 secured at its upper end at 79 to the face of an eccentrically-surfaced sector 81 mounted to turn on its axis in any approved way in a standard 82.

This sector has its smallest radius at the point where the band or strap leaves it when the tare-beam is horizontal, and the radii increase gradually in both directions from such intermediate zone, the purpose of this construction being to produce a uniform effect of the tare-beam throughout the complete range of movement of the pendulum mechanism.

Such sector 81 has either integral therewith or fixed thereto another concentric sector 83 equipped with a pliable metal-strap 80 bearing on its curved surface and attached thereto at 84, the lower end of such band 80 being connected to the upper end of a rod 85 (Fig. 1) pivotally joined at its lower end at 86 to the unfulcrumed end of lever 48.

As is clearly illustrated, the graduated portion of the tare-beam and its correlated adjustable poise 72 are unencased and readily accessible to the user, but the other parts of the tare-beam mechanism are protected by being housed in a suitable casing or covering.

From what precedes, it will be apparent that a container, such as a box or barrel for instance, placed upon the platform 19, by acting through its weight on the connected mechanical elements specified, will rock the tare-beam upwardly, and the weight of the container thus imposed on the platform may be readily balanced by shifting the poise 72 on the beam 71 to the proper position which will indicate on the scale of the beam to the observer the weight of the container.

In this connection it should be noted that the eccentricity of sector 81 provides a constant moment arm for weight 72 throughout its arcuate range, so that the weight of any container so used is properly imposed on the tare-beam without the necessity for variation in the scale graduations by reason of the different positions of the beam due to different weights.

The sector 83 may be concentric to its axis because the transmission-lever to which its band is attached is so far below that under ordinary circumstances an eccentric member at this point is not required.

Further, inasmuch as the tare-beam fulcrum is at one end thereof and there is no downward pull on the beam by the container on the platform, there is much less tendency for wear of the fulcrum means than would occur were the fulcrum at an intermediate point in the length of the beam and downward forces exerted on the beam at opposite sides of its fulcrum, the one by the weight of the container on the platform, the other by the counter-poise.

As a braking or shock-absorbing device for the movements of the parts thus connected together, a dash-pot 87 is located within the base of the scale and is connected to a projection 88 on the nose-iron 17, thus retarding and regulating the movements of the various parts of the scale operatively joined together in the manner hereinbefore indicated, such dash-pot being of any ordinary or suitable construction well known in the art.

From what precedes, it will be apparent that both the graduated disc 64 and the tare-beam 71 are efficiently operatively connected to the platform 19 and its improved and novel supporting means, whereby the advantages accruing from the employment of the latter are availed of both by the disc and the tare-beam in the performance of their functions which are well understood in the art and need no further reference.

This invention as presented in the appended claims is not necessarily limited and restricted to the precise and exact details of structure shown and described because the invention is susceptible of a variety of embodiments and various changes in the particular scale shown may be resorted to without departure from the heart and essence of the invention and without the loss or sacrifice of any of its material benefits and advantages.

I claim:

1. In a scale having weight-absorbing pendulum-means, the combination of a platform, lever-means supporting said platform, a transmission-lever, means operatively connecting said lever-means to said transmission-lever, a rotary weight-indicating wheel, and motion-multiplying means connecting said transmission-lever to said indicating-wheel, whereby movement of the former turns the latter, said connection including a pair of wheels of different diameters rigid with one another and mounted to turn on their common axis as a unit, a tape connected to the smaller of said wheels and operatively connected to said transmission-lever, a third wheel connected to, and rotatable with, said indicating-wheel and of less diameter than the larger of said pair of wheels, and a tape connected to the larger of said pair of wheels and to said third wheel.

2. The structure presented in claim 1 in combination with a tape connected to said third wheel and depending therefrom, and a weight secured to the depending portion of said tape.

3. In a scale having weight-absorbing pendulum-means, the combination of a platform, lever-means supporting said platform, a transmission-lever fulcrumed near one end, means operatively connecting said lever-means to an intermediate portion of said transmission-lever, a rotary weight-indicating wheel, and motion-multiplying means connected to the unfulcrumed end portion of said transmission-lever and to said indicating-wheel, whereby movement of the former turns the latter, said connection including a pair of wheels of different diameters rigid with one another and mounted to turn on their common axis as a unit, a tape connected to the smaller of said wheels and operatively connected to said transmission-lever, a third wheel connected to, and rotatable with, said indicating-wheel and of less diameter than the larger of said pair of wheels, and a tape connected to the larger of said pair of wheels and to said third wheel.

4. In a scale, the combination of a movable member adapted to support the article to be weighed, means to indicate the weight of the article resting on said member, a tare-beam fulcrumed near one end, means connected to said tare-beam near its unfulcrumed end and to said member whereby the movement of said member, due to a weight thereon, raises said unfulcrumed end of said tare-beam, and a counterpoise adjustable on said beam between its fulcrum and said beam-raising means to balance the weight of a container on said movable member.

5. In a scale, the combination of a platform, lever means supporting said platform, a transmission-lever, means to rock said transmission-lever by the movement of said lever means, a fulcrumed tare-beam, means connecting said tare-beam to said transmission-lever including compensating-means, a counterpoise adjustable along said tare-beam to balance the weight of a container on said platform, and means to indicate the weight of a load resting on said platform, said compensating-means providing a constant moment arm for said counterpoise whereby the effect of said counterpoise is maintained constant throughout the total range of the indicating mechanism.

6. In a scale, the combination of a platform, lever means supporting said platform, a transmission-lever, means to rock said transmission-lever by the movement of said lever means, a tare-beam fulcrumed near one end thereof, means, including compensating-means, connecting the unfulcrumed end of said tare-beam to said transmission-lever whereby movement of said transmission-lever, due to a weight on said platform, raises said unfulcrumed end of said tare-beam, a counterpoise adjustable along said tare-beam to balance the weight of a container on said platform, and means to indicate the weight of a load resting on said platform, said compensating-means providing a constant moment arm for said counterpoise whereby the effect of said counterpoise is maintained constant throughout the total range of the indicating means.

7. The structure presented in claim 5 in which said compensating-means include a rocking eccentric and a flexible band fixed thereto and adapted to be wrapped more or less around its eccentric surface and connected to said tare-beam.

8. The structure presented in claim 6 in which said compensating-means include a rocking eccentric and a flexible band fixed thereto and adapted to be wrapped more or less around said eccentric and connected to said tare-beam.

9. The structure presented in claim 5 in which said compensating-means include a rocking eccentric having an intermediate portion of smallest radius with the radii increasing therefrom in both directions and a flexible band fixed to said eccentric and adapted to be wrapped more or less around its eccentric surface and connected to said tare-beam.

10. The structure presented in claim 6 in which said compensating-means include a rocking eccentric having an intermediate portion of smallest radius with the radii increasing therefrom in both directions and a flexible band fixed to said eccentric and adapted to be wrapped more or less around its eccentric surface and connected to said tare-beam.

JAMES M. TRINER.